US011313974B2

(12) United States Patent
Savoy, Jr. et al.

(10) Patent No.: US 11,313,974 B2
(45) Date of Patent: Apr. 26, 2022

(54) GNSS SPOOFING DETECTION USING TERRAIN MAPPING

(71) Applicant: Honeywell International Inc., Morris Plains, NJ (US)

(72) Inventors: John D. Savoy, Jr., Olathe, KS (US); Harold Anthony Zulch, III, Phoenix, AZ (US); Gary Ostrom, Bellevue, WA (US)

(73) Assignee: Honeywell International Inc., Charlotte, NC (US)

( * ) Notice: Subject to any disclaimer, the term of this patent is extended or adjusted under 35 U.S.C. 154(b) by 123 days.

(21) Appl. No.: 16/814,457

(22) Filed: Mar. 10, 2020

(65) Prior Publication Data

US 2021/0286086 A1   Sep. 16, 2021

(51) Int. Cl.
    *G01S 19/21*   (2010.01)
(52) U.S. Cl.
    CPC .................. *G01S 19/215* (2013.01)
(58) Field of Classification Search
    CPC .................................................. G01S 19/215
    See application file for complete search history.

(56) References Cited

U.S. PATENT DOCUMENTS

| | | | |
|---|---|---|---|
| 6,281,832 B1 * | 8/2001 | McElreath | G01S 13/935 342/65 |
| 6,424,914 B1 | 7/2002 | Lin | |
| 6,512,976 B1 | 1/2003 | Sabatino et al. | |
| 7,145,501 B1 * | 12/2006 | Manfred | G01C 5/005 342/120 |
| 7,880,667 B2 | 2/2011 | Lanzkron | |
| 7,952,519 B1 | 5/2011 | Nielsen et al. | |
| 8,321,074 B1 | 11/2012 | Bell et al. | |
| 8,755,954 B1 | 6/2014 | McCusker et al. | |
| 9,182,495 B2 * | 11/2015 | Stevens | G01S 19/20 |
| 9,222,799 B1 * | 12/2015 | Bell | G01S 19/15 |
| 9,494,691 B2 | 11/2016 | Gum et al. | |

(Continued)

FOREIGN PATENT DOCUMENTS

EP   2910468 A1   8/2015

OTHER PUBLICATIONS

Carroll, "Using Motion Fields to Estimate Video Utility and Detect GPS Spoofing", Electrical and Computer Engineering Commons, Aug. 8, 2012, pp. 1-83, Brigham Young University.

(Continued)

*Primary Examiner* — Cassi J Galt
(74) *Attorney, Agent, or Firm* — Fogg & Powers LLC

(57) ABSTRACT

A system comprises processing circuitry configured to receive position data from a global navigation satellite system (GNSS) receiver and to receive a first vehicle height above terrain (HAT) from HAT circuitry. A lateral position and an altitude are derived from the position data. The processing circuitry is further configured to determine terrain elevation based upon the lateral position. The processing circuitry is further configured to determine a second vehicle height above terrain (HAT) based upon subtracting the determined terrain elevation from the altitude. The processing circuitry is further configured to detect GNSS spoofing based upon a difference between the first vehicle HAT and the second vehicle HAT; and upon detecting GNSS spoofing, issue an alert.

20 Claims, 2 Drawing Sheets

(56) References Cited

U.S. PATENT DOCUMENTS

| | | | |
|---|---|---|---|
| 9,689,686 | B1 | 6/2017 | Carmack et al. |
| 9,725,171 | B1 | 8/2017 | Carmack et al. |
| 9,849,978 | B1 | 12/2017 | Carmack et al. |
| 9,958,549 | B2 | 5/2018 | Psiaki et al. |
| 2002/0188386 | A1* | 12/2002 | Day .................. G01S 13/935 701/4 |
| 2009/0140887 | A1 | 6/2009 | Breed et al. |
| 2011/0238307 | A1 | 9/2011 | Psiaki et al. |
| 2017/0285171 | A1 | 10/2017 | Ries |
| 2019/0243002 | A1 | 8/2019 | Song |
| 2019/0302272 | A1 | 10/2019 | Balog et al. |
| 2019/0317221 | A1* | 10/2019 | Molina-Markham ................. G01S 19/215 |

OTHER PUBLICATIONS

Dorn et al., "Non-Coherent Spoofing Detection with Real-World Spoofing Attacks", at least as early as Nov. 17, 2017, pp. 1-8.

Hagen et al., "Using Terrain Navigation to Improve Marine Vessel Navigation Systems", Mar./Apr. 2014, pp. 45-58, vol. 48, No. 2, Marine Technology Society Journal.

Jeon et al., "Robust Performance of Terrain Referenced Navigation Using Flash Lidar", 2016, pp. 970-975, IEEE.

European Patent Office, "Extended European Search Report from EP Application No. 21159102.9", from Foreign Counterpart to U.S. Appl. No. 16/814,457, dated Jul. 8, 2021, pp. 1 through 9, Published: EP.

Urquart et al., Innovation: Integrity for Safe Navigation, GPS World, Feb. 12, 2020, pp. 1 through 17.

\* cited by examiner

GNSS SPOOFING DETECTION USING TERRAIN MAPPING

BACKGROUND

Modern navigation technology relies extensively on Global Navigation and Satellite Systems (GNSSs). These systems facilitate fast and accurate determination of position information (i.e. lateral position and altitude) for example for vehicles such as aircraft. The GNSSs include Global Positioning System (GPS), Globalnaya Navigazionnaya Sputnikovaya Sistema (GLONASS), Galileo position system, and BeiDou navigation satellite system.

A GNSS receiver is susceptible to GNSS spoofing, which can cause a GNSS receiver to determine an incorrect three dimensional location and/or time; time means time of day and date. GNSS Spoofing means manipulation of GNSS data received by a GNSS receiver so that the GNSS receiver determines an incorrect three dimensional location and/or time. GNSS data may be manipulated by a transmitter broadcasting data used for position and/or time determination, which mimics data broadcast from one or more GNSS satellites. This manipulated data is then detected by the GNSS receiver instead of the data from the one or more corresponding GNSS satellites, and is used by the GNSS receiver to determine location and time. GNSS spoofing attacks can cause a grave risk to a vehicle, personnel aboard the vehicle (if any), and objective(s) of the vehicle. For example, if altitude is incorrectly determined due to GNSS spoofing, an aircraft could take a landing trajectory that is too steep and may crash.

SUMMARY

In one embodiment, a system is provided. The system comprises processing circuitry configured to receive position data from a GNSS receiver and to receive a first vehicle height above terrain (HAT) from HAT circuitry. A lateral position and an altitude are derived from the position data. The processing circuitry is further configured to determine terrain elevation based upon the lateral position. The processing circuitry is further configured to determine a second vehicle height above terrain based upon subtracting the determined terrain elevation from the altitude. The processing circuitry is further configured to detect GNSS spoofing based upon a difference between the first vehicle HAT and the second vehicle HAT; and upon detecting GNSS spoofing, issue an alert.

In another embodiment, a method is provided. The method comprises receiving position data from a global navigation satellite system receiver. The method further comprises determining terrain elevation based upon a lateral position derived from the received position data. The method further comprises receiving a first vehicle height above terrain from HAT circuitry. The method further comprises determining a second HAT based upon subtracting the determined terrain elevation from an altitude derived from the position data. The method further comprises detecting GNSS spoofing based upon a difference between the first vehicle HAT and the second vehicle HAT; and upon detecting GNSS spoofing, issuing an alert.

In another embodiment, a program product is provided. The program product comprises a non-transitory processor-readable medium on which program instructions, configured to be executed by a programmable processor, are embodied, wherein the program instructions are operable to: receive position data from a global navigation satellite system receiver; determine terrain elevation based upon a lateral position derived from the received position data; receive a first vehicle height above terrain from HAT circuitry; determine a second HAT based upon subtracting the determined terrain elevation from an altitude derived from the position data; detect GNSS spoofing based upon a difference between the first vehicle HAT and the second vehicle HAT; and upon detecting GNSS spoofing, issue an alert.

BRIEF DESCRIPTION OF THE DRAWINGS

Exemplary features of the present disclosure, its nature, and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
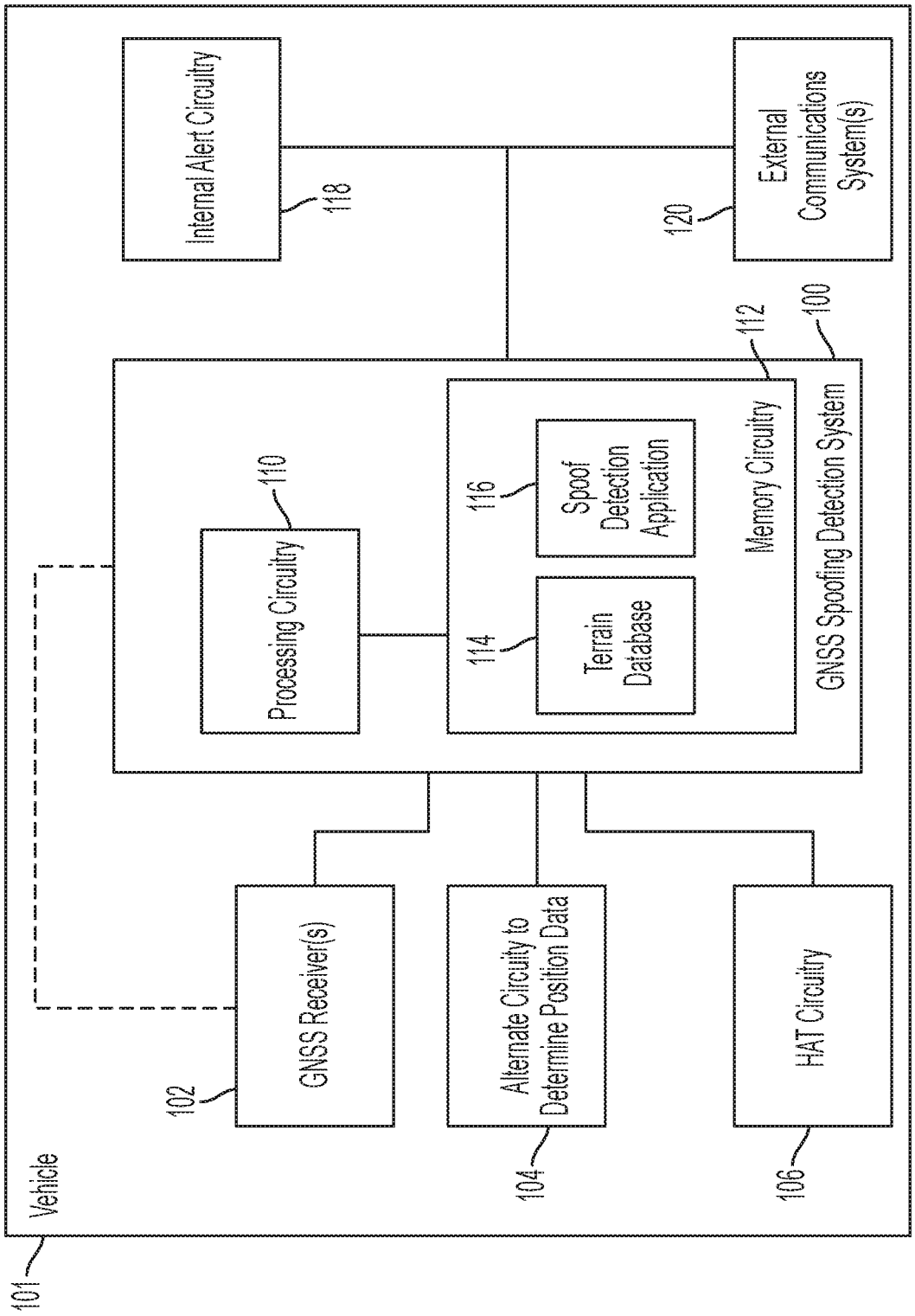
FIG. 1 is a block diagram illustrating one embodiment of a GNSS spoofing detection system.

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Techniques for detecting GNSS spoofing are subsequently described. Optionally, upon such detection, vehicle system(s) and/or vehicle crew can be alerted to GNSS spoofing so that they can take action to diminish risk. Optionally, upon such detection, alternative source(s) of position data may be used to provide position data, instead of a GNSS receiver, so as to determine position of the vehicle.

GNSS spoofing can be detected as follows. Vehicle height above terrain is determined with a sensor (that is not a GNSS receiver and is otherwise referred to as a height above terrain circuitry). Then, a difference between the determined vehicle height above terrain, and a calculated vehicle height above terrain is determined. The calculated vehicle height above terrain is determined by subtracting (a) terrain elevation from (b) vehicle altitude. The vehicle altitude may be determined solely using the GNSS receiver, or using both the GNSS receiver and alternate circuitry to determine position data. For example, vehicle altitude may be determined based upon combining vertical positions separately derived from data from the GNSS receiver and the circuitry to determine position data, which e.g., may be combined to by Kalman filtering, or alternatively averaging the vertical position derived from data from each of the GNSS receiver and the circuitry to determine position data.

Terrain elevation is determined with a terrain database using lateral position. Lateral position and altitude may be determined (at least in part) by the GNSS receiver, or another system utilizing position data derived from data from the GNSS receiver. For example, if the GNSS receiver determines position in polar coordinates, the other system can transform such coordinates to Cartesian coordinates to generate lateral position and altitude. The other system may be GNSS spoofing detection system (or processing circuitry and/or a spoof detection application discussed herein).

If the difference between the determined vehicle height above terrain and the calculated vehicle height above terrain exceeds a threshold level, then GNSS spoofing is determined to have occurred (or has been detected). By more reliably knowing when GNSS data is being spoofed, a vehicle utilizing GNSS technology can more readily protect against such spoofing and thus provide safer transport.

The embodiments disclosed herein are designed to be implemented in vehicles, such as aircraft. Although an aircraft is illustrated throughout the disclosure, this illustration is merely for pedagogical reasons and not intended to be limiting in any sense. Instead, the term "vehicle" is intended to convey the ordinary meaning as understood by one having skill in the art, which includes, but not limited to, air vehicles, space vehicles, water borne ships, submersibles, and other types of vehicles.

FIG. 1 illustrates a block diagram of one embodiment of a GNSS spoofing detection system (system) 100. The system 100 is configured to be coupled to at least one GNSS receiver (GNSS receiver(s)) 102 (e.g. a GPS receiver, GLONASS receiver, BeiDou receiver, a Galileo receiver, and/or any other type of GNSS receiver), and height above terrain (HAT) circuitry 106. The HAT circuitry means circuitry configured to measure the height above terrain, e.g. a radar altimeter, a depth (or echo) sounder, and/or any other circuitry for determining height above terrain.

Optionally, the system 100 is configured to be coupled to at least one alternate circuitry to determine position data (alternate circuitry to determine position data or alternate system(s) to determine position data) 104, internal alert circuitry 118, and/or at least one external communication system (external communications system(s)) 120. The external communications system(s) 120 may comprise high frequency (HF), very high frequency (VHF), satellite communication (SATCOM), WiFi, WiMax, and/or automatic dependent surveillance radio(s). Optionally, the aforementioned components are configured to be mounted in or on a vehicle 101. However, alternatively, the GNSS receiver may be detached from the vehicle 101; for example, for a submarine, the GNSS receiver may be on a mast or a cable at or near a surface of water while the submarine remains submerged under the surface.

The alternate circuitry to determine position data 104 excludes GNSS receiver(s), and may comprise an inertial navigation system (INS), at least one radio navigation system, and/or other circuitry to determine position data. An INS comprises one or more inertial measurement units (IMUs), where each IMU comprises one or more accelerometers and/or one or more gyroscopes. A radio navigation system comprises one or more receivers configured to determine position based upon signals received from, e.g. long-range navigation (LORAN) transmitters, distance measuring equipment (DME) transmitter(s), Very High Frequency Omnidirectional Range (VOR) transmitter(s), and/or other equipment. Optionally, position data can also be obtained from the alternate system(s) to determine position data 104 instead of from the GNSS receiver 102, when signal spoofing is detected.

The system 100 may be implemented as, e.g., a state machine or a neural network. For pedagogical purposes, FIG. 1 illustrates the system 100 implemented as a state machine comprising processing circuitry 110 coupled to memory circuitry 112. Software and/or data stored in the memory circuitry 112 is executed in the processing circuitry 110. In the illustrated embodiment, a GNSS spoof detection application 116 is stored in the memory circuitry 112.

Optionally, a terrain database 114 is stored in the memory circuitry 112. Optionally, the terrain database 114 comprises grid cells defined by lateral position of a surface, and at least a corresponding terrain elevation is associated with a grid cell. Alternatively or additionally, the terrain database 114 may comprise at least equation(s) relating lateral position to terrain elevation. Thus, the terrain database 114 comprises at least terrain elevation with respect to lateral position of a surface. A grid cell means a square or rectangle area of a map, e.g., of the Earth, that has a corresponding terrain elevation. Grid cells may or may have the same area (or size), but at different locations.

The terrain database 114, however, may be stored elsewhere, e.g. in another system communicatively coupled to the processing system circuitry 108. Optionally, the terrain database 114 may be stored in a Terrain Awareness and Warning System (TAWS) (or terrain awareness and warning circuitry), which is used to warn flight crew if a vehicle is in imminent danger of impacting the ground or another obstacle; the other system, e.g., TAWS, is configured to be communicatively coupled to the GNSS spoofing detection system.

The GNSS receiver 102 is configured to acquire GNSS signals, e.g. data from four or more satellites of a GNSS. The GNSS receiver 102 is further configured to use the GNSS signals to determine a three dimensional position, e.g., of the GNSS receiver 102, and thus the vehicle 101, relative to a body such as Earth. Position of the vehicle 102 may include vehicle altitude and vehicle lateral position (e.g. latitude and longitude coordinates). The HAT circuitry 106 is configured to determine the height above terrain of a vehicle 101 (vehicle HAT). For example, the HAT circuitry 106 may measure the vehicle HAT by determining the length of time it takes for a signal(s) emitted by the vehicle 102, e.g., radio waves, acoustic waves, and/or other signals, to reflect from the terrain back to the HAT circuitry 106; however, HAT circuitry 106 may use other techniques to determine height above terrain. The HAT circuitry 106 provides a measurement of the vehicle's HAT independent from position of the vehicle 101 derived from data the GNSS receiver 102. Position derived from data from the GNSS receiver 102, and vehicle HAT determined by a HAT circuitry 106, are sent to the system 100 for analysis to determine whether possible GNSS spoofing has occurred.

Figure 2:
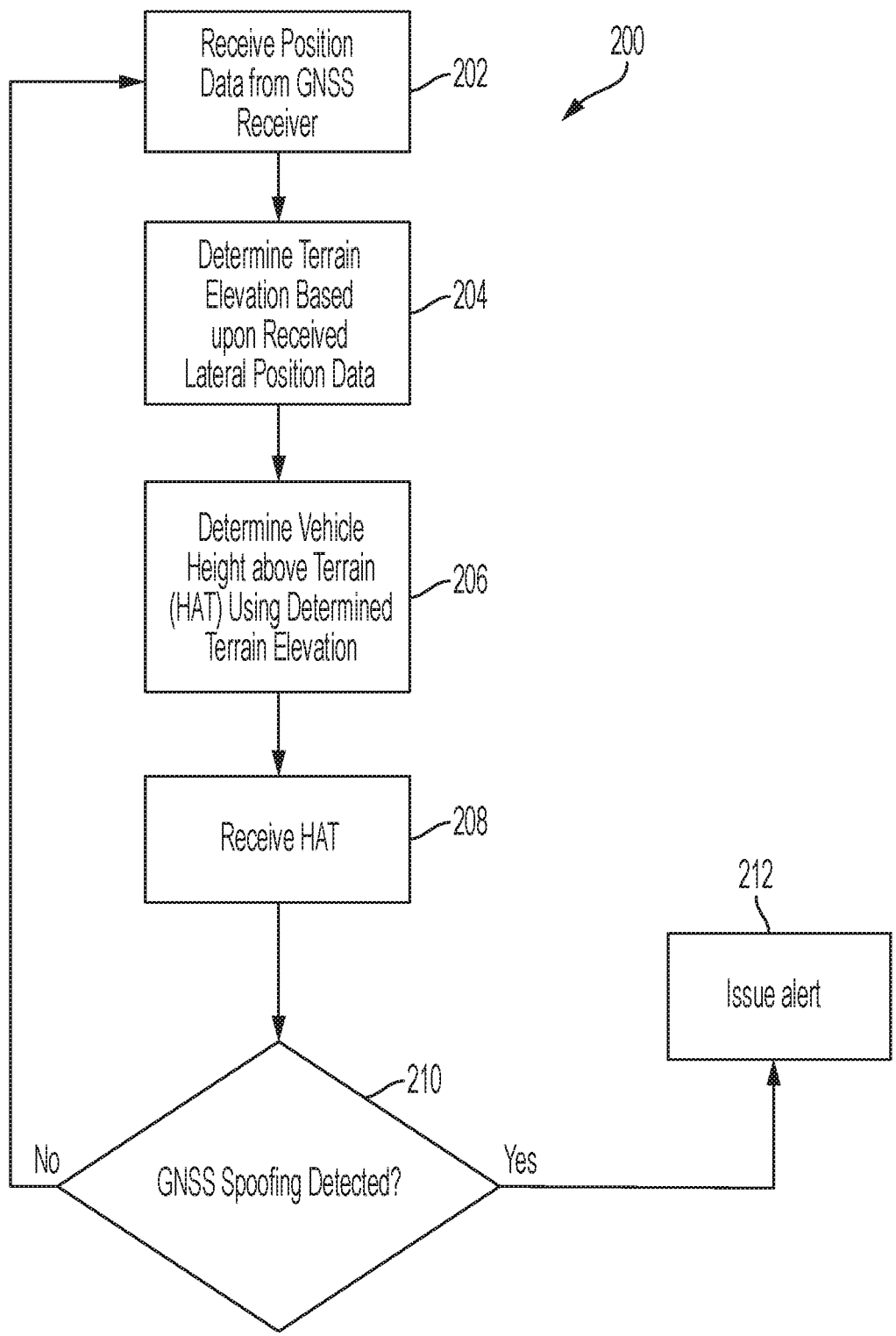
FIG. 2 is a flow diagram illustrating one embodiment of a method for detecting GNSS spoofing.

System 100, e.g. the processing circuitry 110, is configured to execute the instructions of spoof detection application 116. FIG. 2 illustrates one embodiment of a method of implementing the spoof detection application 116; however, the spoof detection application 116 may be implemented in other ways.

The spoof detection application 116 determines a difference between a height above terrain (determined using data from the GNSS receiver 102 and the terrain database 114) with the height above terrain determined by the HAT circuitry 106. Optionally, the difference may be the absolute value of the difference. Optionally, one or more offset values may be added or subtracted from the difference; for example, one offset value corresponds to the difference between the location of the GNSS receiver and the vehicle 101, e.g. due to separation due to a mast or a cable as illustrated herein. The difference, or absolute value of the difference, is compared against a threshold value to determine if spoofing of a GNSS signal has occurred. The threshold value is determined by a system designer or vehicle operator. The threshold value may vary based upon, at least in part, grid cell resolution and/or vehicle height above terrain. For example, if grid cell resolution increases (higher resolution), the threshold value may decrease. For example, alternatively or additionally, if as vehicle height above terrain decreases, then so may the threshold value. The vehicle height above terrain may be determined using vehicle HAT determined by the HAT circuitry 106, calculated vehicle height above terrain (discussed elsewhere herein), or some combination (e.g., an average of both).

Optionally, lateral position and/or altitude derived from data from the GNSS receiver 102, the height above terrain determined by the HAT circuitry 106, position, e.g. altitude, derived from data from alternate circuitry to determine position data 104 (if used to determine the difference), and/or terrain elevation determined from the terrain database may each be filtered before being used to determine the difference. For example, in one embodiment, two or more sets of data may be low pass filtered during a filtering period by averaging the sets of data based upon the number of sets. For example, the number of sets of data to be filtered during a filtering period and/or the length of the filtering period may depend upon the speed of the vehicle; for example, as the speed of the vehicle 101 increases, the number of sets (to be filtered during the filtering period) and/or the filtering period may respectively decrease, and vice versa. Alternatively or additionally, the number of data sets (to be filtered during a filtering period) and/or the filtering period are determined based upon the grid cell resolution of the terrain database 114 corresponding to determined lateral position; for example, as the grid cell resolution decreases, the number of sets (to be filtered during the filtering period) and/or the filtering period may respectively decrease, and vice versa. Thus, as the vehicle speed increases and/or the grid cell resolution decreases, the sensitivity to spoofing decreases. One having ordinary skill in the art will recognize that the number of data sets (to be filtered during a filtering period) and the filtering period can be modified based on the needs of the particular system, e.g. when the filtering parameters vary based upon two or more independent variables such as vehicle speed and grid cell resolution as described above. However, filtering may be performed in different ways then described herein.

If the difference is greater than a threshold level (if the threshold level is a positive number), or less than a threshold level (if the threshold level is a negative number), then the spoof detection application 116 determines that spoofing of the GNSS signal has occurred. Optionally, the spoof detection application 116 only determines if the difference in two or more consecutive grid cells over which the vehicle 101 travels. Optionally, the threshold level is equal to (or greater) than the resolution for a grid cell above or in which the vehicle 101 is located.

In the case where GNSS spoofing is detected, system 100 may respond in a variety of ways depending upon the embodiment. For example, in one embodiment, system 100 optionally includes internal alert circuitry 118 for issuing an alert of a potential GNSS spoofing event, e.g. to system(s) in, and/or to a crew of, the vehicle 101. Internal alert circuitry 118 can be configured to provide an alert: e.g., alert signal(s) (e.g. to system(s) of the vehicle 101), a visual alert (e.g. a message on a display and/or flashing light(s) (e.g. using light emitting diodes)), and/or provide an audible alert (e.g. using an audio amplifier and speaker system). The alert signal(s) may be, e.g., an electrical signal that notifies other systems or circuitry that GNSS spoofing has been detected. Further for example, the alert signal may be sent to a vehicle system that is the GNSS receiver 102. As a result of receiving the alert signal, the GNSS receiver issues an invalidation signal to all systems configured to receive position data from the GNSS receiver 102 warning, and/or the GNSS receiver 102 is configured to cease sending position data; upon receipt of the invalidation signal, a vehicle systems cease using position data from the GNSS receiver 102, and optionally may commence using position data from alternate circuitry to determine position data 104.

Alternatively or additionally, system 100 may be configured to provide an alert (that GNSS spoofing has been detected) to external systems (which are external to the vehicle 101) and/or personnel (e.g. on other vehicle(s) or located terrestrially or in outer space) through the external communications systems 120. Such external system(s) and/or personnel may be associated with control center(s) (e.g. air traffic control center(s)) or operations center(s) (e.g. airline operations center(s)).

FIG. 2 is a flow diagram illustrating one embodiment of a method 200 for detecting GNSS spoofing. Method 200 may be implemented using the system described in FIG. 1, but may be implemented by other means as well. The blocks of the flow diagram have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 202, receive position data (e.g. lateral position, such as latitude and longitude coordinates, and altitude) of the GNSS receiver from a GNSS receiver. Optionally, adjust the received position data to compensate for the location of the GNSS receiver in, on, or outside of the vehicle; for example, the GNSS receiver may be deployed above the vehicle as describe elsewhere herein, or may be offset in or on the vehicle.

In block 204, determine terrain elevation based upon received (or adjusted) lateral position data, e.g. using a terrain database. In block 206, determine vehicle height above terrain using determined terrain altitude, e.g. by subtracting the determined terrain elevation from the vehicle altitude derived from data received from the GNSS receiver. Vehicle HAT can be determined though in other ways. For example, if a vehicle includes a GNSS receiver and alternate system(s) to determine position data, then vehicle altitude can be determined based on vehicle altitudes derived from data from the GNSS receiver and the alternate system(s) to determine position data, e.g. as discussed elsewhere herein.

In block 208, receive HAT, e.g. from HAT circuitry. In block 210, determine if GNSS spoofing has occurred (e.g. has been detected), e.g. as described elsewhere herein. If no GNSS spoofing has been determined to occur, then optionally proceed back to block 202. In the case where no GNSS spoofing has been determined to occur, the position data received by a GNSS receiver is deemed to be sufficiently reliable and is continued to be sent to and/or used by, e.g. vehicle crew, other vehicle system(s), external entit(ies), and/or other vehicle(s)—for example for vehicle navigation. External entit(ies), may include, e.g., traffic control center(s), operations center(s), and/or other vehicle(s).

If GNSS spoofing is determined to occur, then in block 212, issue an alert, e.g. as discussed elsewhere herein. If an alert is sent to other vehicle system(s) (e.g. a flight navigation system and/or a TAWS), the alert may optionally cause the other vehicle system(s) to cease using the position data received from the GNSS receiver, and further optionally may cause some or all of the other vehicle system(s) to commence use position data from alternate circuitry to determine position data in lieu of position data from the GNSS receiver. Alternatively or additionally, the alert may also be sent to the GNSS receiver, which then may send an invalid signal to some or all of the other vehicle system(s); other vehicle system(s) receiving the invalid signal cease using position data from the GNSS receiver and/or some or all of the other vehicle system(s) receiving the invalid signal commence using position data from alternate circuitry to determine position data. Optionally, the alert can include the location at which GNSS signals spoofing was detected, and the time of such detection.

The embodiments of methods can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

The processing circuitry 110 may include any one or combination of processors, microprocessors, digital signal processors, application specific integrated circuits, field programmable gate arrays, and/or other similar variants thereof. The processing circuitry 110 may include or function with software programs, firmware, or other computer readable instructions for carrying out various process tasks, calculations, and control functions, used in the methods described herein. These instructions are typically tangibly embodied on any storage media (or computer readable media) used for storage of computer readable instructions or data structures.

Suitable computer readable media may include storage or memory media such as the memory circuitry 112 illustrated herein. The memory circuitry 112 described herein can be implemented with any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media.

Terrain database 114 describes at least terrain elevation over an area. Terrain database 114 as used herein may include either conventional database(s), data storage formats of any type, e.g. data files, and/or equation(s). Optionally, the terrain database 114 may be a terrain map. The terrain database 114 contains terrain data, including at least terrain elevation data corresponding to at least one location. Such terrain data can embody a set of geographic coordinate points (e.g., represented in Cartesian coordinates) and terrain features (e.g. terrain elevation) corresponding to each point in discrete form and/or using a model, e.g., one or more equations. Optionally, the terrain database 114 may comprise one or more grid cells. Grid cells are lateral regions of the terrain database 114. Optionally, each grid cell has a given resolution. The resolution is the area of the grid cell (e.g., how much of the Earth's surface it covers) in the terrain database 114. The grid cell resolution of the terrain database 114 may vary amongst grid cells. For example, if vehicle 101 is an aircraft, the grid cell resolution may be higher (smaller grid cell area in a grid of geographic coverage) in locations where an aircraft is intended to land, e.g. an airport, a landing strip, or an aerodrome.

Exemplary Embodiments

Example 1 includes a system, comprising: processing circuitry configured to receive position data from a GNSS receiver and to receive a first vehicle height above terrain (HAT) from HAT circuitry, wherein a lateral position and an altitude is derived from the position data; wherein the processing circuitry is further configured to: determine terrain elevation based upon the lateral position; determine a second vehicle height above terrain (HAT) based upon subtracting the determined terrain elevation from the altitude; detect GNSS spoofing based upon a difference between the first vehicle HAT and the second vehicle HAT; and upon detecting GNSS spoofing, issue an alert.

Example 2 includes the system of Example 1, wherein the processing circuitry is further configured to adjust the received position data to compensate for a location of the GNSS receiver, and where at least one of: the lateral position is derived from the adjusted position data, and the altitude is derived from the adjusted position data.

Example 3 includes the system of any of Examples 1-2, wherein the altitude is further derived from data acquired from alternate circuitry to determine position.

Example 4 includes the system of any of Examples 1-3, wherein detect GNSS spoofing comprises: determine an absolute value of the difference between the first vehicle HAT and the second vehicle HAT; and determine that the absolute value of the difference is greater than a threshold value.

Example 5 includes the system of Example 4, wherein the threshold value is determined based upon at least one of: grid cell resolution, and the altitude.

Example 6 includes the system of any of Examples 1-5, wherein the processing circuitry is further configured to filter, based upon at least one of vehicle speed, grid cell resolution, at least one of the lateral position, the altitude, and the received first height above terrain.

Example 7 includes the system of any of Examples 1-6, further comprising at least one other vehicle system configured to receive the issued alert, and upon receiving the issued alert, configured to use position data from alternate circuitry to determine position data in lieu of position data from the GNSS receiver.

Example 8 includes a method, comprising: receiving position data from a global navigation satellite system (GNSS) receiver; determining terrain elevation based upon a lateral position derived from the received position data; receiving a first vehicle height above terrain (HAT) from HAT circuitry; determining a second HAT based upon subtracting the determined terrain elevation from an altitude derived from the position data; detecting GNSS spoofing based upon a difference between the first vehicle HAT and the second vehicle HAT; and upon detecting GNSS spoofing, issuing an alert.

Example 9 includes the method of Example 8, further comprising adjusting the received position data to compensate for a location of the GNSS receiver, and where at least one of: the lateral position is derived from the adjusted position data, and the altitude is derived from the adjusted position data.

Example 10 includes the method of any of Examples 8-9, wherein the altitude is further derived from data acquired from alternate circuitry to determine a position.

Example 11 includes the method of any of Examples 8-10, wherein detecting GNSS spoofing comprises: determining an absolute value of the difference between the first vehicle HAT and the second vehicle HAT; and determining that the absolute value of the difference is greater than a threshold value.

Example 12 includes the method of Example 11, wherein the threshold value is determined based upon at least one of: grid cell resolution, and the altitude.

Example 13 includes the method of any of Examples 8-12, further comprising filtering, based upon at least one of vehicle speed, grid cell resolution, at least one of the lateral position, the altitude, and the received first height above terrain.

Example 14 includes the method of any of Examples 8-13, further comprising receiving the issued alert by at least one other vehicle system, and upon receiving the issued alert, using, in the at least one other vehicle system, position data from alternate circuitry to determine position data in lieu of position data from the GNSS receiver.

Example 15 includes a program product comprising a non-transitory processor-readable medium on which program instructions, configured to be executed by a programmable processor, are embodied, wherein the program instructions are operable to: receive position data from a global navigation satellite system (GNSS) receiver; determine terrain elevation based upon a lateral position derived from the received position data; receive a first vehicle height above terrain (HAT) from HAT circuitry; determine a second HAT based upon subtracting the determined terrain elevation from an altitude derived from the position data; detect GNSS spoofing based upon a difference between the first vehicle HAT and the second vehicle HAT; and upon detecting GNSS spoofing, issue an alert.

Example 16 includes the program product of Example 15, wherein the program instructions are further operable to: adjust the received position data to compensate for a location of the GNSS receiver, and where at least one of: the lateral position is derived from the adjusted position data, and the altitude is derived from the adjusted position data.

Example 17 includes the program product of any of Examples 15-16, wherein the altitude is further derived from data acquired from alternate circuitry to determine a position.

Example 18 includes the program product of any of Examples 15-17, wherein detect GNSS spoofing comprises: determine an absolute value of the difference between the first vehicle HAT and the second vehicle HAT; and determine that the absolute value of the difference is greater than a threshold value.

Example 19 includes the program product of Example 18, wherein the threshold value is determined based upon at least one of: grid cell resolution, and the altitude.

Example 20 includes the program product of any of Examples 15-19, wherein issuing an alert further comprises issuing an alert to at least one of: the GNSS receiver, at least one other vehicle system, at least one external entity, and at least one other vehicle.

Terms of relative position as used in this application are defined based on a plane parallel to the conventional plane or working surface of a material (e.g. a layer or a substrate), regardless of orientation. Terms such as "on," "higher," "lower," "over," "top," and "under" are defined with respect to the conventional plane or working surface being on the top surface of a layer or substrate, regardless of orientation.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:
    processing circuitry configured to receive position data from a global navigation satellite system (GNSS) receiver and to receive a first vehicle height above terrain (HAT) from HAT circuitry, wherein a lateral position and a vehicle altitude is derived from the position data;
    wherein the processing circuitry is further configured to:
        determine, with data obtained from a terrain database including a plurality of grid cells, a terrain elevation based upon the lateral position;
        determine a second vehicle height above terrain (HAT) based upon subtracting the determined terrain elevation from the vehicle altitude;
        detect GNSS spoofing based upon a difference between the first vehicle HAT and the second vehicle HAT; and
        upon detecting GNSS spoofing, issue an alert,
    wherein detect GNSS spoofing comprises determine an absolute value of the difference between the first vehicle HAT and the second vehicle HAT; and determine that the absolute value of the difference is greater than a threshold value, wherein the threshold value is determined based upon at least one of: grid cell resolution of the terrain database and the vehicle altitude.

2. The system of claim 1, wherein the processing circuitry is further configured to adjust the received position data to compensate for a location of the GNSS receiver, and where at least one of: the lateral position is derived from the adjusted position data, and the vehicle altitude is derived from the adjusted position data.

3. The system of claim 1, wherein the vehicle altitude is further derived from data acquired from alternate circuitry to determine position.

4. The system of claim 1, wherein the threshold level is equal to or greater than the resolution for a grid cell that corresponds to a location of a vehicle.

5. The system of claim 1, wherein the threshold value decreases when the grid cell resolution increases.

6. The system of claim 1, wherein the processing circuitry is further configured to filter at least one of the lateral position, the vehicle altitude, and the received first vehicle height above terrain based upon at least one of vehicle speed and the grid cell resolution.

7. The system of claim 1, further comprising at least one other vehicle system configured to receive the issued alert, and upon receiving the issued alert, configured to use position data from alternate circuitry to determine position data in lieu of position data from the GNSS receiver.

8. A method, comprising:
receiving position data from a global navigation satellite system (GNSS) receiver;
determining, with data obtained from a terrain database including a plurality of grid cells, a terrain elevation based upon a lateral position derived from the received position data;
receiving a first vehicle height above terrain (HAT) from HAT circuitry;
determining a second HAT based upon subtracting the determined terrain elevation from a vehicle altitude derived from the position data;
detecting GNSS spoofing based upon a difference between the first vehicle HAT and the second vehicle HAT, wherein detecting GNSS spoofing comprises:
determining an absolute value of the difference between the first vehicle HAT and the second vehicle HAT; and
determining that the absolute value of the difference is greater than a threshold value, wherein the threshold value is determined based upon at least one of: grid cell resolution of the terrain database or the vehicle altitude; and
upon detecting GNSS spoofing, issuing an alert.

9. The method of claim 8, further comprising adjusting the received position data to compensate for a location of the GNSS receiver, and where at least one of: the lateral position is derived from the adjusted position data, and the vehicle altitude is derived from the adjusted position data.

10. The method of claim 8, wherein the altitude is further derived from data acquired from alternate circuitry to determine a position.

11. The method of claim 8, further comprising decreasing the threshold value as the grid cell resolution increases.

12. The method of claim 8, further comprising decreasing the threshold value as the vehicle height above terrain decreases.

13. The method of claim 8, further comprising filtering at least one of the lateral position, the vehicle altitude, and the received first vehicle height above terrain based upon at least one of vehicle speed and the grid cell resolution.

14. The method of claim 8, further comprising receiving the issued alert by at least one other vehicle system, and upon receiving the issued alert, using, in the at least one other vehicle system, position data from alternate circuitry to determine position data in lieu of position data from the GNSS receiver.

15. A program product comprising a non-transitory processor-readable medium on which program instructions, configured to be executed by a programmable processor, are embodied, wherein the program instructions are operable to:
receive position data from a global navigation satellite system (GNSS) receiver;
determine, with data obtained from a terrain database including a plurality of grid cells, a terrain elevation based upon a lateral position derived from the received position data;
receive a first vehicle height above terrain (HAT) from HAT circuitry;
determine a second HAT based upon subtracting the determined terrain elevation from a vehicle altitude derived from the position data;
detect GNSS spoofing based upon a difference between the first vehicle HAT and the second vehicle HAT, wherein to detect GNSS spoofing comprises:
determine an absolute value of the difference between the first vehicle HAT and the second vehicle HAT; and
determine that the absolute value of the difference is greater than a threshold value, wherein the threshold value is determined based upon at least one of: grid cell resolution of the terrain database or the vehicle altitude; and
upon detecting GNSS spoofing, issue an alert.

16. The program product of claim 15, wherein the program instructions are further operable to:
adjust the received position data to compensate for a location of the GNSS receiver, and where at least one of: the lateral position is derived from the adjusted position data, and the vehicle altitude is derived from the adjusted position data.

17. The program product of claim 15, wherein the vehicle altitude is further derived from data acquired from alternate circuitry to determine a position.

18. The program product of claim 15, wherein the program instructions are further operable to filter at least one of the lateral position, the vehicle altitude, and the received first height above terrain based upon at least one of vehicle speed and the grid cell resolution.

19. The program product of claim 18, wherein filter at least one of the lateral position, the vehicle altitude, and the received first height above terrain further comprises at least one of: decreasing a filtering period as the vehicle speed increases, or decreasing a number of filterable data sets during the filtering period as the grid cell resolution decreases.

20. The program product of claim 15, wherein issuing an alert further comprises issuing an alert to at least one of: the GNSS receiver, at least one other vehicle system, at least one external entity, and at least one other vehicle.

* * * * *